United States Patent [19]
Kamiya et al.

[11] Patent Number: 5,320,077
[45] Date of Patent: Jun. 14, 1994

[54] FUEL CONTROL SYSTEM FOR INTERNAL COMBUSTION ENGINE

[75] Inventors: Naoyuki Kamiya; Toshifumi Hayami, both of Kariya, Japan

[73] Assignee: Nippondenso Co., Ltd., Kariya, Japan

[21] Appl. No.: 27,323

[22] Filed: Mar. 4, 1993

[30] Foreign Application Priority Data

Mar. 5, 1992 [JP] Japan .................................. 4-048616
Mar. 24, 1992 [JP] Japan .................................. 4-066201

[51] Int. Cl.$^5$ .............................................. F02M 3/00
[52] U.S. Cl. .................................................... 123/339
[58] Field of Search ............... 123/339, 585, 478, 418, 123/518

[56] References Cited

U.S. PATENT DOCUMENTS

| | | | |
|---|---|---|---|
| 4,951,627 | 8/1990 | Watanabe et al. | 123/339 |
| 5,002,026 | 3/1991 | Ohkumo et al. | 123/339 |
| 5,024,196 | 6/1991 | Ohuchi | 123/585 |
| 5,054,450 | 10/1991 | Oota et al. | 123/478 |
| 5,133,319 | 7/1992 | Ikeda et al. | 123/418 |
| 5,148,788 | 9/1992 | Saikalis et al. | 123/590 |
| 5,199,272 | 4/1993 | Yamanaka et al. | 62/133 |
| 5,216,991 | 6/1993 | Iida et al. | 123/518 |

FOREIGN PATENT DOCUMENTS

57-49039 3/1982 Japan .
62-12383 3/1987 Japan .
62-42147 9/1987 Japan .
1265122 10/1989 Japan .

*Primary Examiner*—Raymond A. Nelli
*Attorney, Agent, or Firm*—Cushman, Darby & Cushman

[57] ABSTRACT

A system for exactly detecting any unstable state in which disturbance is caused on the output value of a thermal air flowmeter for measuring intake air flow rate, thereby preventing or promptly suppressing the generation of undesirable states such as a variation in the air-fuel ratio or rough idling.

The system has an upstream intake air temperature sensor for detecting the temperature of the intake air before entering an air cleaner element, the above-mentioned thermal air flowmeter, and a downstream air temperature sensor for detecting the temperature of the intake air after passing the thermal air flowmeter. The system determines that the air flow rate output of the thermal air flowmeter is unstable, when the difference between the air temperature values detected by the upstream and downstream intake air temperature sensors exceeds a predetermined value, and executes a control process which has been determined to cope with such an unstable state. Whether an unstable state exists or not may be determined from the amount of variation of the output value from the thermal air flowmeter.

15 Claims, 16 Drawing Sheets

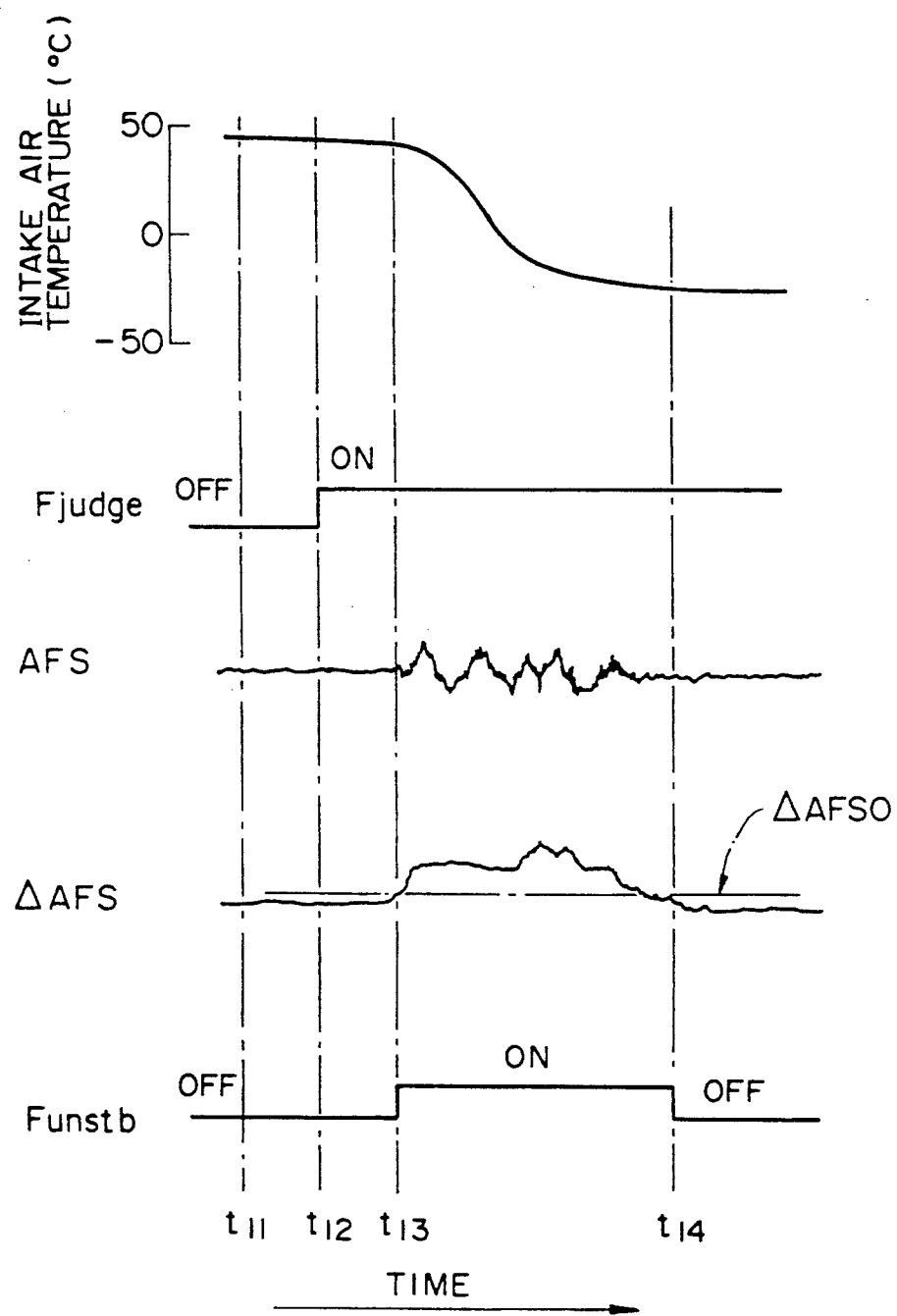

T3 > T2 > T1

FUEL CONTROL SYSTEM FOR INTERNAL COMBUSTION ENGINE

BACKGROUND OF THE INVENTION

1. Field of the Invention

The present invention broadly relates to an internal combustion engine having a thermal air flowmeter. More particularly, the present invention relates to a device for detecting the transient state at which the temperature of intake air drastically changes, and also to an air-fuel mixture control device using such a detection device.

2. Description of the Related Art

A system has been known which computes fuel injection rate based on the intake air flow rate measured by a thermal air flowmeter and which executes fuel injection in accordance with the computed injection rate. This system suffers from a problem in that a disturbance is caused on the output of the thermal air flowmeter due to a drastic change in the intake air temperature, particularly when the intake air flow rate is small as in the case of idling, resulting in a variation in the air-fuel ratio and rough idling.

In order to overcome this problem, a system has been proposed which corrects the air-fuel ratio in accordance with the air temperature during idling of engine, as disclosed in Japanese Patent Laid-Open No. 57-49039, as well as a system employing a special temperature sensor responsive to drastic change in the intake air temperature and performing quick compensation for the change in the air temperature, as disclosed in Japanese Patent Examined Publication No. 62-12383.

These proposed systems, however, do not satisfactorily suppress the variation in the air-fuel ratio or rough idling, because the output of the thermal air flowmeter, which is the object of the temperature compensation, is unstable in the transient period in which the intake air temperature changes rapidly.

In addition, the temperature sensor employed in the system disclosed in Japanese Patent Examined Publication No. 62-12383 cannot determine whether disturbance a on the output of the thermal air flowmeter has taken place and is lasting due to a drastic change in the air temperature, although it can quickly detect such a drastic change in the air temperature occurring at a certain position.

Disturbance of the output from the thermal air flowmeter is a phenomenon which takes place, for example, under the conditions which will be described later. In some cases, the disturbance which is actually taking place may be attributed to a reason other than a presently detected slight change in the air temperature. In some other cases, disturbance of the output of the thermal air flowmeter is not caused even when the air temperature is changing rapidly. It is also considerable that the disturbance continues even after the air temperature at the measuring point has been settled. Thus, a mere detection of a drastic air temperature variation cannot provide any basis for exact determination of occurrence and state of disturbance in the output from the thermal air flowmeter.

Conditions Under Which Disturbance May Occur

For instance, disturbance of the output from a thermal air flowmeter tends to occur when an automobile engine is re-started after a short engine-off period at the top of a hill following climbing, or when the automobile starts to descend the hill with the engine idling after making a short stop at the hill top without turning the engine off.

In such cases, the heat accumulated in the engine body is transmitted to the space inside the intake passage during the engine-off period or during idling. The heat is accumulated in the air cleaner element which has a large thermal capacity to be heated to a high temperature. When the engine is re-started or the automobile starts to descend with the engine idling, ambient air of low temperature, sucked through the air cleaner element, is heated by the air cleaner element while cooling the latter. Consequently, heated air is introduced into the intake passage.

Consequently, air temperature is locally high and low in the intake passage downstream of the air cleaner, causing convection and local densifying and thinning of the intake air, resulting in a turbulence of the intake air.

This undesirable state lasts long when the intake air flow rate is small as in the case of idling, because, as shown in FIG. 19A, the fresh air flows only through a local portion 103 of the air cleaner element 101.

Consequently, as shown in FIG. 19B, a non-uniform temperature distribution is developed over the air cleaner element 101 such that the temperature is lowest at the portion 103 and progressively gets higher as the distance from the portion 103 increases, so as to create a state $T3 > T2 > T1$. This non-uniform temperature distribution is maintained for a long time because of the accumulation of heat in the air cleaner element 101 during the engine-off period or idling.

The present inventors have confirmed, through an experiment, that a considerably long time, e.g., 10 minutes or longer, is required until uniform temperature distribution is recovered over the entire portion of the air cleaner element during parking or hill descending with the engine idling, after re-start of the engine following a short idling or engine-off period subsequent to long heavy load engine operation.

The non-uniform temperature distribution in the air cleaner element 101 causes, as explained above, turbulence in the flow of air due to convection and local densifying or thinning of the air. In such a case, the thermal air flowmeter responds to such turbulence of air flow, with the result being that a disturbance or ripple is caused in the output of the air flowmeter. In the conventional system, the fuel injection rate is determined on the basis of the air flow rate indicated by the output of the air flowmeter. Consequently, the ripple of the output of the air flowmeter causes a fluctuation of the fuel injection rate, resulting in a fluctuation in the air-fuel ratio or rough idling.

Conversely, when the engine operates with a large intake air flow rate, a large flow rate of air passes the entire portion of the air cleaner element 101 per unit time, so that the air cleaner element 101 is uniformly cooled. As a result, the air cleaner element is rapidly cooled while maintaining uniform temperature distribution over the entire portion. Thus, the ripple of the output of the thermal air flowmeter is only momentarily, despite a drastic change in the intake air temperature, when intake air is sucked at a large rate.

As will be understood from the foregoing description, a mere detection an abrupt change in the intake air temperature by a specific temperature sensor does not provide any basis for determination as to whether the sensed temperature change would be such one as to cause a ripple in the output from the air flowmeter, or any basis for prediction of the time required until the ripple is attenuated to stabilize the flowmeter output after the sensing of the abrupt change in the air temperature. Thus, the conventional control method relying upon such uncertain information is sometimes useless, meaningless or insufficient.

SUMMARY OF THE INVENTION

Accordingly, a first object of the present invention is to provide a fuel control system for an internal combustion engine, having a device for determining a transient state of the intake air temperature and which can exactly detect any unstable state caused by a ripple of the output from a thermal air flowmeter.

A second object of the present invention is to provide an air-fuel mixture control device which incorporates the above-mentioned intake air temperature transient state determination device and which can prevent or quickly attenuate any fluctuation in the air-fuel ratio or rough idling caused by a ripple of the output from the air flowmeter.

To achieve the first object, the present invention provides a device used in an internal combustion engine having an air cleaner element and a thermal air flowmeter downstream of the air cleaner element, the device being for determining a transient state of the intake air temperature in which the output from the thermal air flowmeter is unstable, the device comprising upstream air temperature detection for detecting the temperature of air upstream of the air cleaner element, downstream air temperature detection for detecting the temperature of air downstream of the air cleaner element, and determining that an intake air temperature transient state is occurring making the output of the air flowmeter unstable, on the condition that the difference between the upstream and downstream air temperature is not lower than a predetermined value.

Thus, the intake air temperature transient period is determined on the basis of the difference between the air temperatures upstream and downstream of the air cleaner element, the difference being the cause of non-uniform temperature distribution throughout the air cleaner element, rather than on the basis of a detection of a drastic change in the air temperature. Thus, the determination is conducted on the basis of the cause of non-uniform temperature distribution in the air cleaner element which leads to a ripple of the output of the air flowmeter.

In order to achieve the same object, the present invention also provides a device used in an internal combustion engine having an air cleaner element and a thermal air flowmeter downstream of the air cleaner element, the device being for determining the transient state of intake air temperature in which the output from the thermal air flowmeter is unstable, the device detecting fluctuation of the output from the air flowmeter; and determining, when the amount of the fluctuation detected exceeds a predetermined amount, that the intake air temperature is in the transient state which makes the output of the air flowmeter unstable. In this case, the determination is conducted properly based upon the detection of a phenomenon which is a result, rather than a phenomenon which causes such a result.

To achieve the second object, the present invention provides an air-fuel mixture control device for an internal combustion engine having an air cleaner element, a thermal air flowmeter disposed downstream of the air cleaner element, and an air-fuel mixture control computing the conditions concerning the air-fuel mixture to be fed to the engine on the basis of the output from the thermal air flowmeter and for executing control of the air-fuel mixture in accordance with the computed conditions, the device detecting the temperature of air upstream of the air cleaner element, detecting the temperature of air downstream of the air cleaner element, determining that an intake air temperature transient state is occurring which makes the output of the air flowmeter unstable, on condition that the difference between the upstream and downstream air temperature is not lower than a predetermined value, and transient state controller for causing a predetermined processing corresponding to the intake air temperature transient state when the intake air temperature transient state is occurring.

According to this control device, it is possible to properly determine that an intake air temperature transient state is occurring which makes the output of the thermal air flowmeter unstable, based on a phenomenon which is the cause of such unstable output, and predetermined processing is executed in response to such determination. The control processing which is executed in response to the determination of the occurrence of the intake air temperature transient state is conducted not momentarily but rather is continued until the above-mentioned phenomenon becomes not indicative of the unstable state of the thermal air flowmeter. Consequently, control of the air-fuel mixture is conducted satisfactorily to eliminate any influence from a lack of stability in the measured air flow rate, while avoiding meaningless or unnecessary control.

According to the invention, the second object is also achieved by an air-fuel mixture control device for an internal combustion engine having an air cleaner element, a thermal air flowmeter disposed downstream of the air cleaner element, and an air-fuel mixture control for computing the conditions concerning the air-fuel mixture to be fed to the engine on the basis of the output from the thermal air flowmeter and for executing control of the air-fuel mixture in accordance with the computed conditions, the device detecting fluctuation of the output from the air flowmeter; determining, when the amount of the fluctuation detected exceeds a predetermined amount, that the intake air temperature is in the transient state which makes the output of the air flowmeter unstable, and transient state controller for causing a predetermined processing corresponding to the intake air temperature transient state when determined that an intake air temperature transient state is occurring. This device conducts the control based on a phenomenon which is a result, thus further enhancing the adequateness of the control while attaining further elimination of unnecessary control.

In each of the air-fuel mixture control devices mentioned above, the predetermined control may be such one as to set the control conditions to increase the intake air flow rate. When such a control is performed, the cause of the unstable state of the measured air flow rate attributable to a drastic change in the intake air temperature, i.e., the small intake air flow rate, is suppressed to enable an earlier recovery of the uniform temperature distribution throughout the air cleaner element. It is therefore possible to suppress the unstable state of the measured air flow rate in a shorter time, thus coping with the problem or undesirable state such as rough idling.

The transient state controller may be so arranged as to vary the basis for the computation of the conditions concerning the air-fuel mixture performed by the air-fuel mixture control. The control can be performed without becoming meaningless or less significant due to low credibility of the measured value of the air flow rate.

Alternatively, the transient state control may be so arranged as to vary the basis for the control of the air-fuel mixture performed by the air-fuel control. In such control, the response characteristic of the air-fuel mixture control device is varied so as to avoid unstable control.

Preferably, each of the air-fuel mixture control devices mentioned above determines whether or not the engine is in an idling state, and, in each control device, the transient state control executes the predetermined control only when the engine is idling. This arrangement is preferred because it eliminates any uselessness of the control.

The present invention also provides a fuel control system for an internal combustion engine, comprising: an auxiliary air flow rate controlling actuator disposed in an auxiliary air passage by-passing a throttle valve in an intake passage and controlling the flow rate of auxiliary air during idling of the engine; a thermal air flowmeter provided in the intake passage for measuring the flow rate of intake air; an intake air temperature detecting means provided in the intake passage for detecting the temperature of the intake air; storage for storing the relationship between a value corresponding to the amount of control of the auxiliary air flow rate and the intake airflow rate; computing the rate of fuel injection from a fuel injector on the basis of the intake air flow rate measured by the thermal air flowmeter and the engine speed, when the engine is not idling or when, even though the engine is idling, the amount of variation of the intake air temperature is within a predetermined range; and determining the intake air flow rate using the data stored in the storage from the value corresponding to the amount of control of the auxiliary air flow rate and for computing the rate of fuel injection from the fuel injector on the basis of the intake air flow rate determined using the data and the engine speed, in a thermal transient state in which the amount of variation of the intake air temperature exceeds a predetermined value while the engine is idling.

Preferably, the data stored in the storage is learned from the value corresponding to the amount of control of the auxiliary air flow rate controlling actuator and the intake air flow rate measured by the thermal air flowmeter, when the amount of variation of the intake air temperature is below the predetermined value.

According to this arrangement, when the amount of variation in the intake air temperature falls below a predetermined amount, the rate of fuel injection from the fuel injector is computed on the basis of the intake air flow rate as measured by the thermal air flowmeter and the engine speed, regardless of whether or not the engine is in an idling condition. When the amount of variation in the intake air temperature exceeds the predetermined amount while the engine is idling, the second fuel injection rate computing means determines, using the data stored in the storage means, the intake air flow rate is determined using the data stored in the storage from a value corresponding to the amount of control of the auxiliary air flow rate control actuator, and the fuel injection rate is computed on the basis of the thus computed intake airflow rate and the engine speed.

Thus, when the intake air temperature has been changed drastically while the engine is idling, the fuel injection rate is determined without relying upon the intake airflow rate measured by the thermal air flowmeter which has a risk of erroneous measurement of the air flow rate.

BRIEF DESCRIPTION OF THE DRAWINGS

FIG. 7 is a timing chart explanatory of the operation of the second embodiment;

DESCRIPTION OF THE PREFERRED EMBODIMENT

A description will now be given of an embodiment of the present invention.

A system embodying the present invention will be described first with reference to FIGS. 1 and 2.

Figure 1:
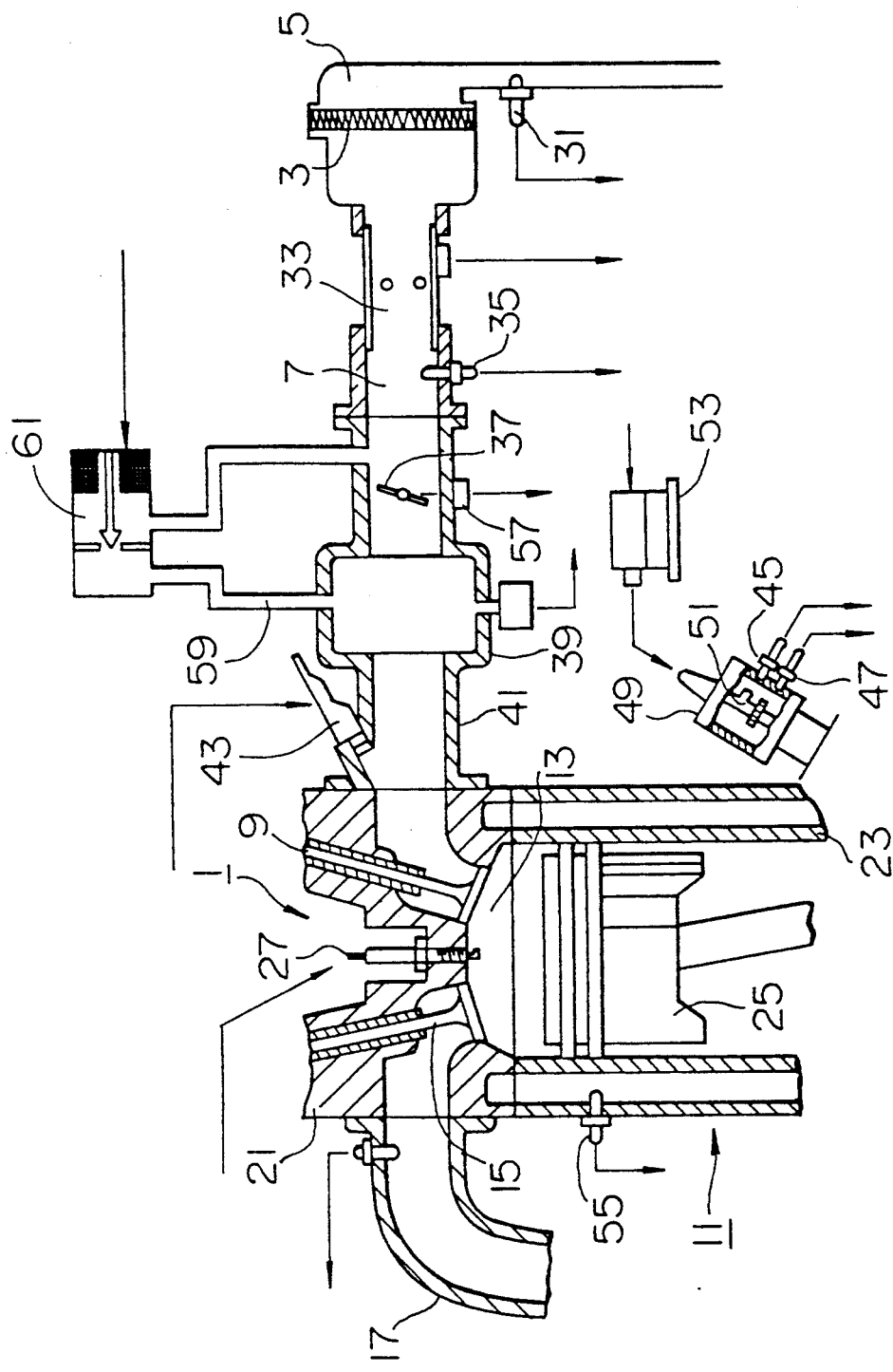
FIG. 1 is an illustration of a system as an embodiment of the present invention.
Figure 2:
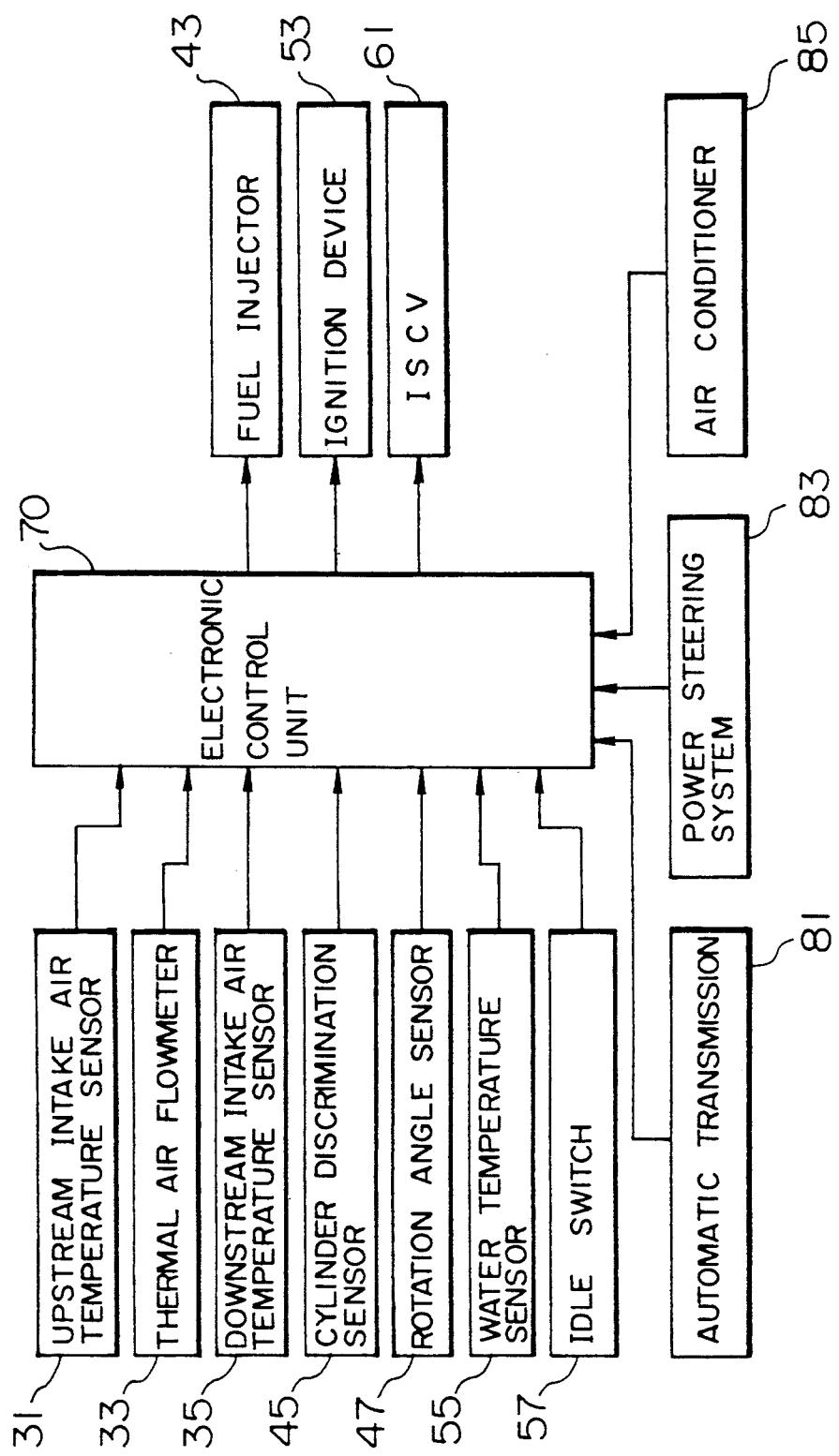
FIG. 2 is a block diagram of the control system employed in the embodiment.

FIGS. 1 and 2 show an internal combustion engine control system 1 embodying the present invention. The internal combustion engine has a known basic arrangement in which intake air sucked through an air cleaner 5 accommodating an air cleaner element 3 is fed into a combustion chamber 13 in the engine body 11 through an intake passage 7 and past an intake valve 9, together with a fuel, and the mixture undertakes compression and explosion strokes to generate exhaust gases which are emitted from an exhaust valve 15 and relieved to the air through an exhaust pipe 17.

The combustion chamber 13 is defined by a cylinder head 21, a cylinder block 23 and a piston 25. The ignition of the air-fuel mixture in the combustion chamber 13 is effected by a sparking plug 27.

The following elements are arranged in the mentioned order along the intake passage 7 from the upstream end: an upstream intake air temperature sensor 31 for sensing the temperature of the intake air before entering the air cleaner element 3, a thermal air flowmeter 33 for detecting the flow rate of the intake air, a downstream intake air temperature sensor 35 for sensing the temperature of the intake air which has passed the thermal air flowmeter 33, a throttle valve 37 operatively connected to an accelerator pedal, a surge tank for suppressing pulsation of the intake air pressure, and an intake pipe 41. One of the critical features of the present invention resides in that the intake air temperature sensors 31 and 35 ar disposed upstream and downstream of the air cleaner element 33. In this embodiment, both the intake air temperature sensors 31 and 35 have identical constructions.

The intake pipe 41 connected to the engine body 11 is provided with an electromagnetic fuel injector 43 which operates in response to electric pulses supplied thereto. The fuel injector 43 opens its injecting passage for a predetermined time so as to supply a fuel at a required rate to a portion of the intake passage bear the intake port at an appropriate timing. A cylinder discrimination sensor 45 and a rotation angle sensor 47 are provided for the purpose of detecting parameters such as the timing of fuel injection. The cylinder discrimination sensor 45 and the rotation angle sensor 47 cooperate with each other in detecting the crank angle on the basis of the rotational phase of a shaft 51 of a distributor 49 and generate pulses respectively. An electric current to be supplied to the sparking plug 27 is formed by an ignition device 53 incorporating an ignition coil. More specifically, a secondary current generated in the ignition device 53 is supplied to the sparking plug 27 through the distributor 49. A water temperature sensor 55 is attached to a cylinder block 23 in order to detect the temperature of the engine cooling water. An idle switch 57 is disposed in the vicinity of the throttle valve 37. This idle switch produces an ON signal upon sensing that the throttle valve 37 has been closed to the idle position.

The intake passage 7 is provided with a by-pass passage 59 which by-passes the throttle valve 37. This by-pass passage 59 is provided with an idle speed control valve (ISCV) 61 for controlling the engine speed during idling.

The described system is under the control of an electronic control unit 70 which delivers control signals to the fuel injector 43, the ignition device 53 and the ISCV 61 upon receipt of signals from the upstream intake air temperature sensor 31, thermal air flowmeter 33, downstream intake air temperature sensor 35, cylinder discrimination sensor 45, rotation angle sensor 47, water temperature sensor 55 and the idle switch 57. The electronic control unit 70 is constructed as a computer unit composed of a logical computing circuit having a CPU, ROM, RAM and other components. The electronic control unit 70 also receives a shift position signal from an automatic transmission 81, and operation signals from a power steering system 83 and an air conditioner 85.

The electronic control unit 70 excites the control of air-fuel ratio by varying the rate of fuel injection. More specifically, the flow rate of intake air is computed by a known method from the value sensed by the thermal air flowmeter 33, and determines the fuel injection rate on the basis of the computed air flow rate and the engine speed so as to attain it in conformity with the desired command value of the air-fuel ratio. The electronic control unit 70 then actuates and controls the fuel injector 43 so as to attain the desired air-fuel ratio. Thus, the electronic control unit 70 performs the control of air-fuel ratio on the basis of the air flow rate measured by the thermal air flowmeter.

The output from the thermal air flowmeter 33 must accurately represent the airflow rate. The ordinary routine of air-fuel ratio control based upon the output of the thermal air flowmeter 33, therefore, should not be conducted when the output of the thermal air flowmeter is not credible due to an unstable state of the flowmeter. Such an unstable state, which is not suitable for the air-fuel ratio control, takes place in the transient state of the intake air temperature in which the air cleaner element is cooled only locally to exhibit non-uniform temperature distribution, as explained before in connection with the problem of the prior art.

A description will now be given of the structural features, as well as operation and advantage, of a first embodiment of the present invention which determines whether the unstable state of the air flow rate output is actually taking place in the above-described system.

Figure 3:
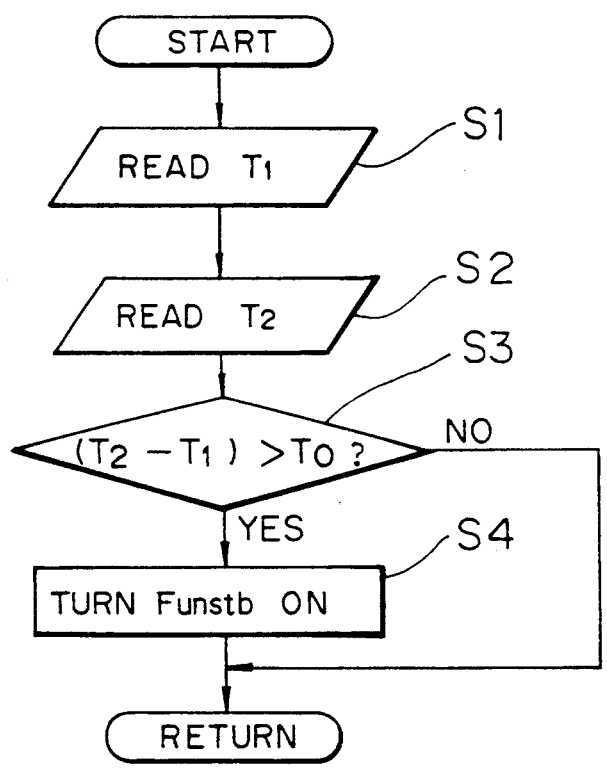
FIG. 3 is a flow chart illustrative of the computing operation performed in a first embodiment.

In the first embodiment, the determination as to whether the unstable state of the output of the thermal air flowmeter is taking place is conducted by the electronic control unit 70, through execution of the computing routine shown in FIG. 3 on the basis of the signals from the upstream intake air temperature sensor 31 and the downstream intake air temperature sensor 35.

When this computing routine is started, the temperature value T1 sensed by the upstream intake air temperature sensor 31 is read in Step S1 and the temperature value T2 sensed by the downstream intake air temperature sensor 35 is read in the subsequent Step S2. Then, a subsequent Step S3 determines whether the difference (T2−T1) between the sensed temperature values T1 and T2 exceeds a predetermined threshold value T0. When the condition of T2−T1>T0 is met, an unstable state flag Funstb indicative of lack of stability in the air flow rate output is turned on in Step S4. The threshold value T0 is determined on the basis of an experiment which is conducted in the course of the design of the automobile.

Figure 4:
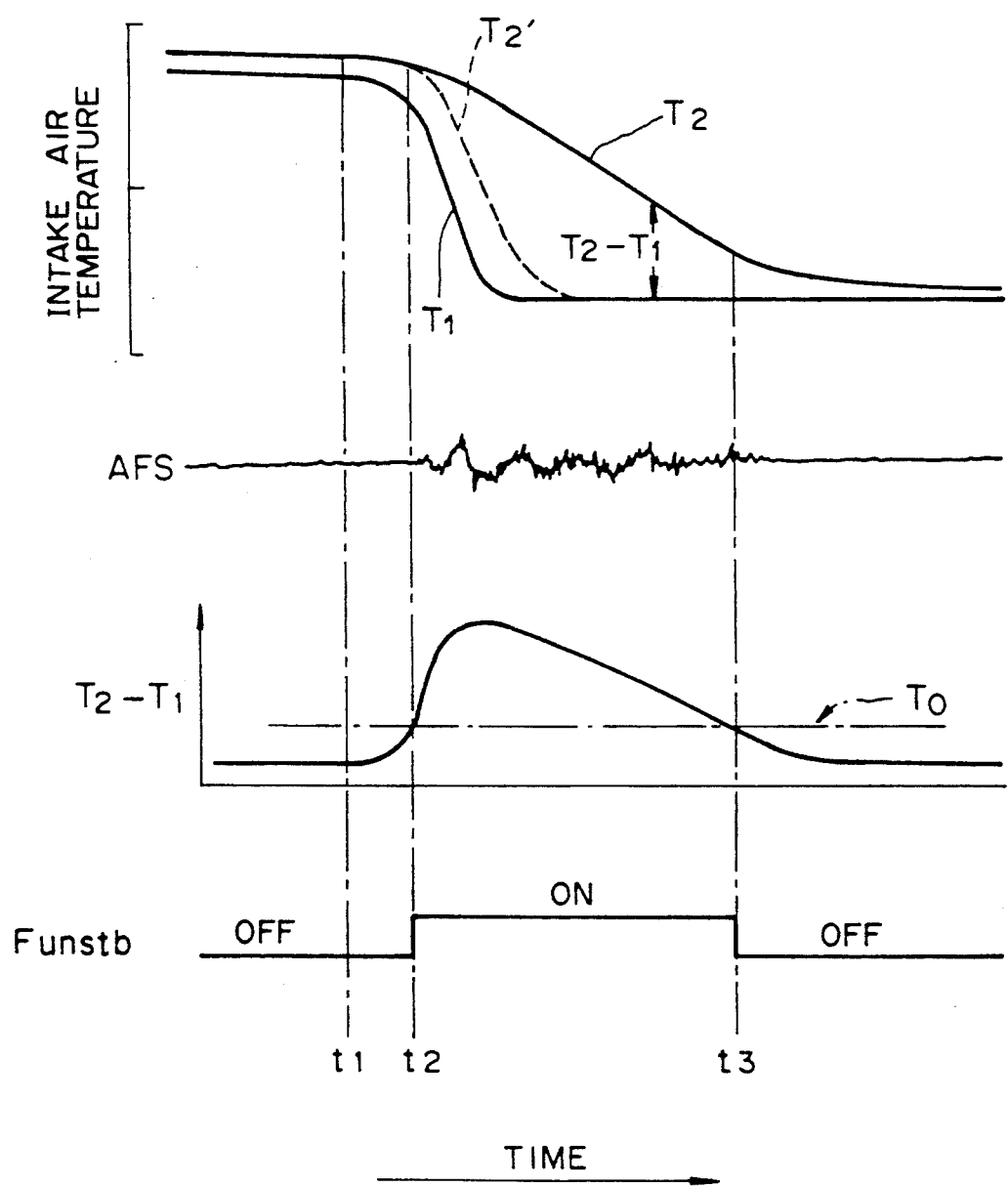
FIG. 4 is a timing chart explanatory of the operation of the first embodiment.

FIG. 4 shows the relationships between the sensed intake air temperature values T1, T2 and the output signal AFS from the thermal air flowmeter 33, as well as the state of setting of the unstable state flag Funstb conducted as a result of the above-described processing, as observed when the engine is re-started or the automobile has started to descend a slope after elapse of a predetermined engine-off or idling period subsequent to a heavy load operation of the engine.

Referring to FIG. 4, the engine has operated under a heavy load and then kept off or in an idle state up to a moment t1. Thus, the temperature inside the intake passage 7 has been elevated by the heat from the engine, in the period before the moment t1. Consequently, the air cleaner element 3 has been heated up to a high temperature by the heat transmitted from the intake passage 7, thus accumulating a large flow rate of heat due to its large heat capacity. High temperature also has been established in the region near the upstream intake air temperature sensor 31 upstream of the air cleaner element 3, due to the heat transmitted from the air cleaner element 3. Consequently, outputs indicative of high temperature levels are derived from the intake air temperature sensors 31 and 35.

At the moment t1, the engine is re-started or the automobile starts to descend with its engine idling. Accordingly, ambient air starts to flow into the intake passage 7 through the air cleaner element 7 at this moment. Consequently, the output value T1 of the upstream intake air temperature sensor 31 starts to decrease drastically from a moment t2 which is immediately after the re-start of the engine. In contrast, the output value T2 of the downstream intake air sensor 35 descends only slowly because the air downstream of the air cleaner element 3 has been warmed by the heat accumulated in the air cleaner element during engine-off period. Since both intake air temperature sensors 31 and 35 have the same level of sensitivity, the difference between the output values of these sensors appears mostly under such condition that the air cleaner element 3 has not been sufficiently cooled.

The output AFS of the thermal air flowmeter 33 ripples in the period between the moment t2 at which the difference starts to appear between the output values of both intake air temperature sensors and a moment t3 at which this difference is substantially eliminated.

We have found that the state in which the output AFS ripples correspond to a certain period in which the temperature difference T2−T1 exceeds a certain value T0. This certain value T0 is the aforementioned predetermined threshold value T0.

Consequently, the unstable state flag Funstb is set to an ON state only during the period between the moment t2 and the moment t3, as a result of the described processing. This exactly corresponds to the period in which ripples are generated in the output from the thermal air flowmeter 33.

This determination is conducted by comparing the difference (T2−T1) between the intake air temperature sensors 31,32 upstream and downstream of the air cleaner element 3 with the threshold value T0. Thus, the described embodiment is clearly distinguished in the following respects from the known method in which the start of an unstable state is determined on the basis of the detection of a drastic change in the intake air temperature at a certain point downstream of the air cleaner element 3.

Thus, in the described first embodiment, occurrence of an unstable state of the output from the intake air temperature sensor is confirmed upon detection of the of such a state that the temperature of the air after passing through the air cleaner element 3 does not come down quickly because the cooling of the air cleaner element 3 proceeds only locally due to small rate of flow of air through the air cleaner element 3. In FIG. 4, a broken-line curve T2′ shows the temperature value sensed by the downstream intake air temperature sensor 35 when the air cleaner element 3 is cooled rapidly and uniformly due to large flow rate of the intake air. In such a case, the first embodiment does not determine that the unstable state of the air flowmeter is taking place.

This should be contrasted to the known art disclosed in Japanese Patent Publication No. 62-12383 in which any drastic change in the temperature at a certain position is sensed by a special temperature sensor and the occurrence of an unstable state is determined on the basis of the result of the detection of such a drastic change in the temperature. This known art, therefore, determines that the unstable state has been caused when the output from the downstream intake air temperature sensor 35 varies along the broken-line curve T2′, and that the unstable state is not taking place when the output from the downstream intake air temperature sensor 35 decreases gently as indicated by the curve T2, conversely to the determination conducted in the described first embodiment of the invention.

Thus, according to the first embodiment as described, it is possible to accurately detect an occurrence of an unstable state exactly corresponding to the period in which the output from the thermal air flowmeter 33 ripples.

A description will now be given of a second embodiment in which the electronic control unit 70 executes the computing operation based on the output signals from the thermal air flowmeter 33 and the idle switch 57.

Figure 5:
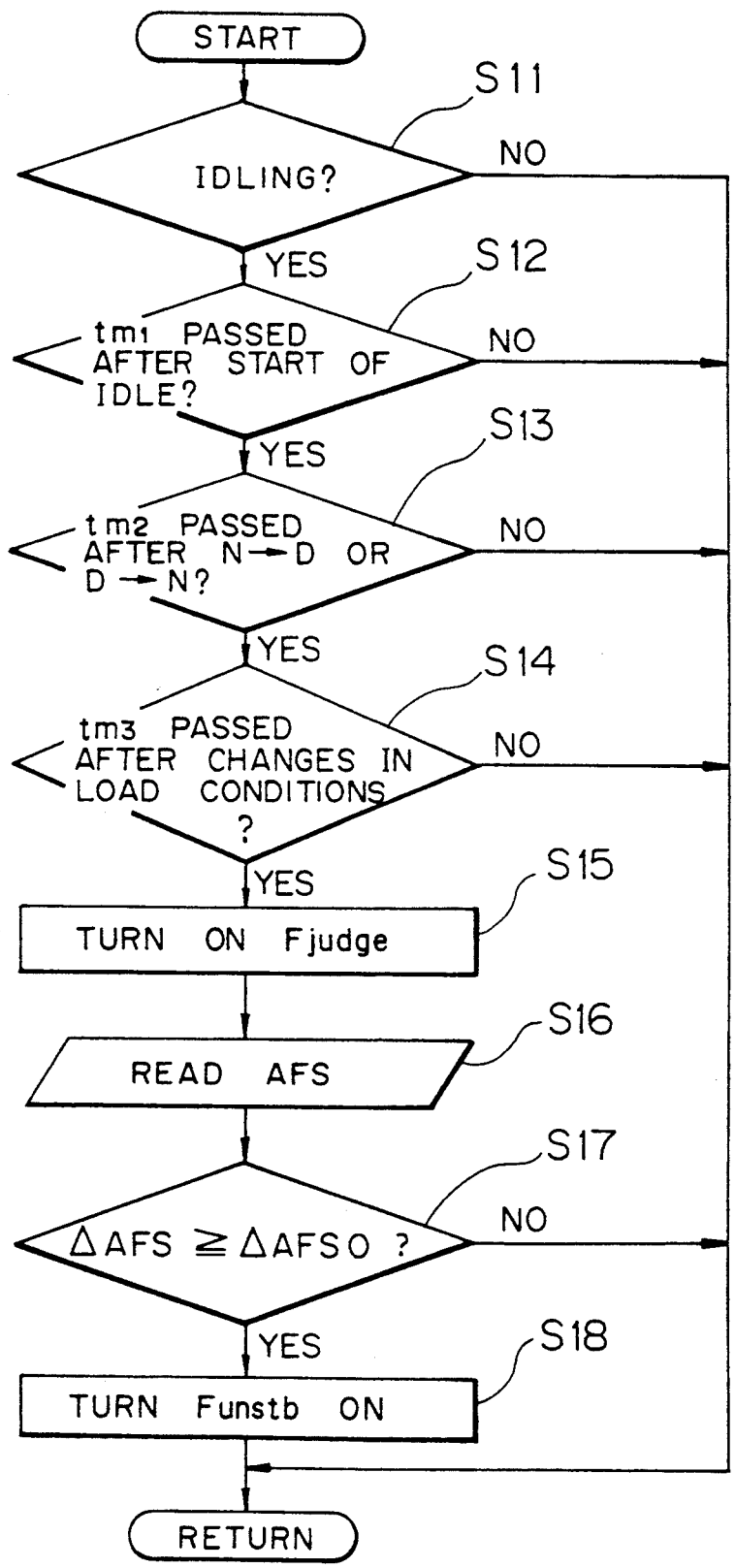
FIG. 5 is a flow chart illustrative of a computing operation performed in a second embodiment.

In this embodiment, the electronic control unit 70 determines whether or not the engine is idling, on the basis of the output from the idle switch 57, in Step S11 (shown in FIG. 5). In this embodiment, and the following processings are not conducted when the engine is not idling. This is because the problem concerning the rippling of the output from the thermal air flowmeter 33 is not so critical when the intake air flow rate is large, i.e., when the engine is in its operation phase other than idling. Even if an unstable state is caused, such a state lasts only a short time and does not significantly affect the air-fuel ratio control when the intake air flow rate is large.

When the engine is idling, an answer YES is given to the question posed in Step S11. The process then proceeds to Step S12 which determines whether a predetermined time tm1 has passed after turning the idle switch 57 on. When the answer YES is given to the question posed in Step S12, the process proceeds to Step S13 which determines whether a predetermined time tm2 has passed after switching of the shift position signal of the automatic transmission 81 from N (Neutral Range) to D (Drive Range). When the answer is YES in Step S13, a determination is conducted as to whether a predetermined time tm3 has passed after a change in the state of a load such as the power steering system 8 or the air conditioner 85 in Step S14.

The determination steps S12 to S14 are conducted to accurately determine only the occurrence of the unstable state attributable to a drastic change in the intake air temperature. Various changes are caused for reasons other than a drastic change in the air temperature, in various transient periods such as the period immediately after the start of idling, the period immediately after a shift range or the period immediately after the air conditioner is turned on, and such changes may lead to an erroneous determination in the subsequent processings. Such erroneous determination is avoided in this embodiment because only the unstable state caused by a drastic change in the air temperature is taken into consideration.

The process proceeds to Step S15 only when the answers to the questions posed in Steps S11 to S14 are YES. In this step S15, a determination enable flag Fjudge is turned on to enable a determination of an occurrence of the unstable state of the air flow rate output. In Step S16, the output signal AFS of the thermal air flowmeter 33 is read, and, in Step S17, a determination is given as to whether the variation amount ΔAFS of the output signal AFS exceeds the predetermined threshold value ΔAFS0. If the answer is YES in Step S17, an unstable state flag Funstb indicative of the unstable state of the airflow rate output is turned on in Step S18.

A description will now be given of the method of determining the amount ΔAFS of the output signal AFS which is used in the determination executed in Step S17, with reference to FIGS. 6A and 6B.

Figure 6A:
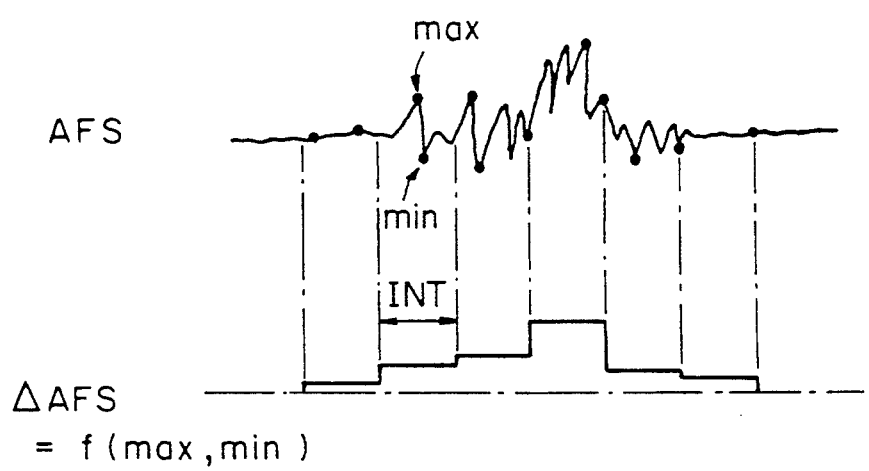
FIGS. 6A and 6B are illustrations of a method employed in the second embodiment for computing the amount of variation of the air flow rate signal used in the computing operation.

In this embodiment, as shown in FIG. 6A, the variation amount ΔAFS is regarded as being a value indicative of the amount of variation of the output signal AFS in a unit period INT. More specifically, the variation amount ΔAFS is computed in accordance with the following equation (1) on the basis of the maximum and minimum values max and min detected within the unit period INT.

$$\Delta AFS = f(max, min) = (max - min)/(max + min) \quad (1)$$

Figure 6B:
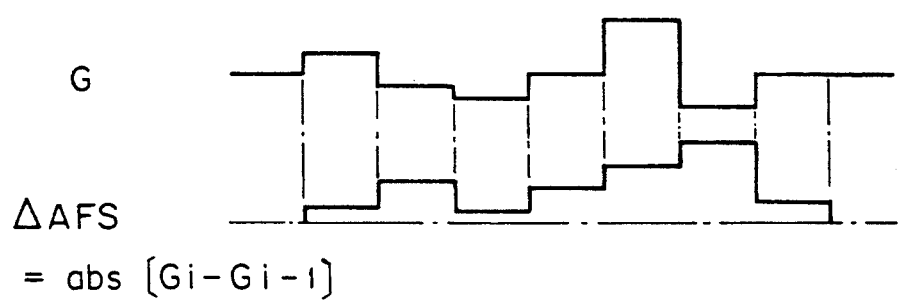

In place of the above-described computing method relying upon the voltage level of the output signal AFS, a method may be adopted in which the variation amount ΔAFS is computed in accordance with the following equation (2), using a computed flow rate G which is obtained by converting the signal voltage by a known formula, as shown in FIG. 6B. The computed flow rate G itself is used as a base for the computation of actual fuel injection rate and, therefore, is computed for every 180° of crank angle in case of a four-cylinder engine. The flow rate G computed for the purpose of the control of fuel injection control may be directly applied to the equation (2). Thus, there is no need for providing separate means for computing the flow rate G.

$$\Delta AFS = abs [G_i - G_{i-1}] \quad (2)$$

The suffix i indicates the computed flow rate corresponding to the cylinder in which the fuel is to be injected, while i−1 indicates the cylinder which is immediately before the cylinder i in terms of the fuel injection order. A symbol abs[ ] means the absolute value of the value in [ ].

The operation of the second embodiment will be described with reference to FIG. 7.

As in the case of the first embodiment, it is assumed that the engine is re-started or the automobile starts to descend a slope with the engine idling, after a predetermined engine-off or idle period subsequent to a heavy load operation or hill climbing.

The moment t11 is the moment at which the engine is re-started. At this moment, the determination enable flag Fjudge is still off because the engine has just started to idle. The determination enable flag Fjudge is turned on for the first time at a moment t12 which is a predetermined time after the moment t11. At this moment t12, at least a predetermined period tm1 has passed after the start of the idling, and at least predetermined periods tm2 and tm3 have passed after a change in the shift position and turning on of the air conditioner, respectively.

Any variation in the output signal from the thermal air flowmeter 33, taking place immediately after the start of idling, sometimes should be attributed to a reason other than the drastic change in the intake air temperature, e.g., a variation in the load. In other words, various factors are considerable as the cause of the variation in the output of the thermal air flowmeter 33 taking place immediately after the start of idling, so that the determination may not be carried out correctly in the period immediately after the start of idling. It is therefore necessary to prohibit the determination by setting the determination enable flag Fjudge till the moment t12.

Thus, any large variation in the air flow rate signal AFS from the thermal air flowmeter 33 taking place after the moment t12 can be correctly attributed to a drastic change in the intake air temperature and consequent convection or local concentration of air downstream of the air cleaner element 3, rather than to other reasons such as a variation in the load.

The threshold value ΔAFS0 used in the processing executed in Step S17 is determined through experiment in relation to the variation or ripple of the airflow rate signal AFS caused by the convection and local concentration. Consequently, the unstable state flag Funstb is set on in the period which is later than the moment t12 and in which the amount of variation ΔAFS 20 exceeds the predetermined threshold ΔAFS0, i.e., in the period between the moments t13 and t14. Since this determination can be executed under conditions free from the influence of factors such as variation in the load on the air conditioner, the on state of the unstable state flag Funstb exactly represents the occurence of unstable state of the air flow rate signal due to a drastic change in the intake air temperature.

Thus, the second embodiment is constructed as a system which detects the occurrence of a problem actually caused in a thermal transient phenomenon concerning the intake air. It is therefore possible to exclude any unnecessary control operation which would otherwise be executed to cope with a problem which actually does not exist. Namely, it is possible to detect a state which actually requires the control, and to execute without failure the control only when such a state is detected.

In the first and second embodiments, an unstable state of the air flow rate output from the thermal air flowmeter is determined by the methods described hereinbefore. Then, a control processing is executed to optimally control the air-fuel ratio. Examples of such control are described below.

Figure 8:
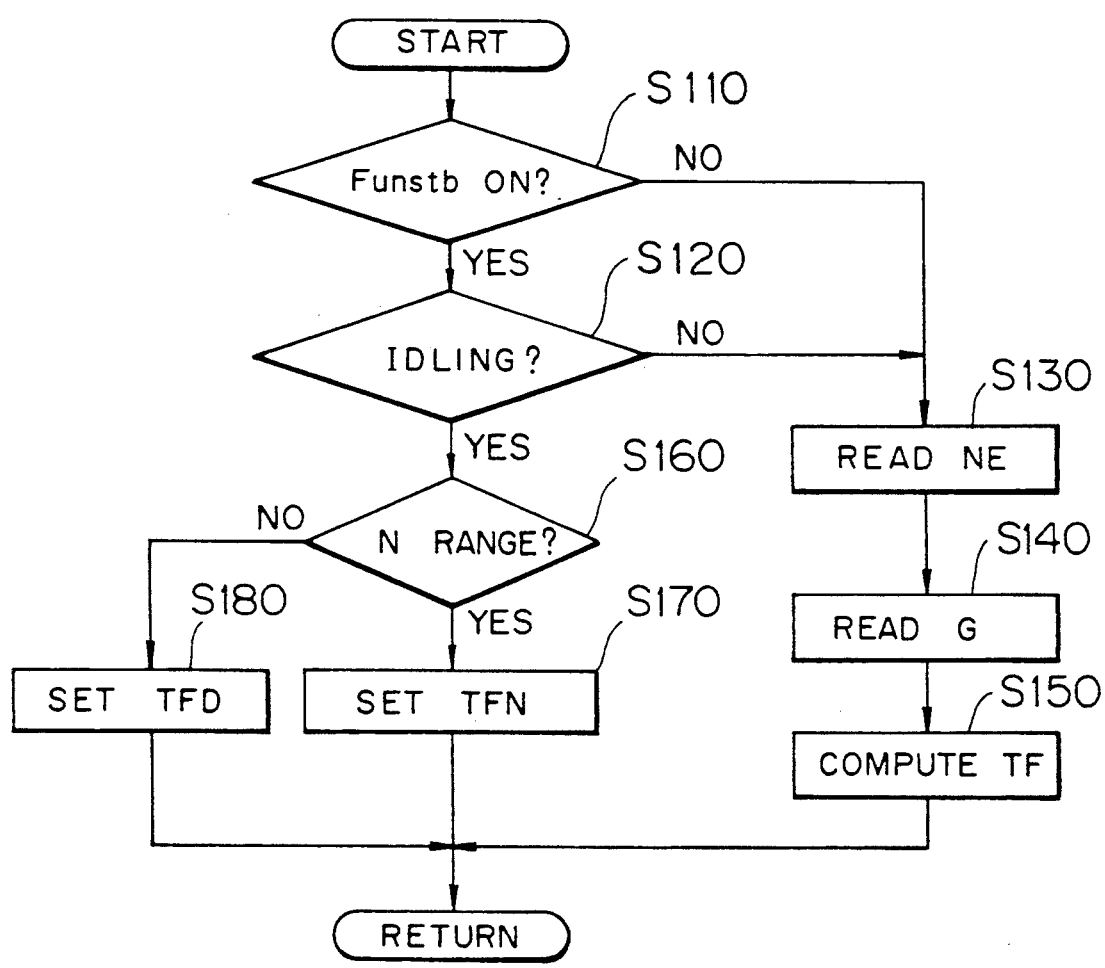
FIG. 8 is a flow chart illustrative of a process control of the first embodiment.

FIG. 8 shows a first example of the control.

In this Example, a determination is conducted as to whether a stable state due to drastic change in the intake air temperature actually exists, on the basis of the state of the unstable state flag Funstb, in Step S110. If the answer is YES, the process proceeds to Step S120 which determines whether the engine is in the idling state. Conversely, there is no unstable state or when the engine is not idling even though unstable state exists, a routine known in the field of fuel injection control is executed: namely, the engine speed is read in S130, the air flow rate G computed in accordance with a predetermined equation from the thermal air flowmeter AFS is read in Step S140, and the fuel injection pulse TF is determined on the basis of the engine speed and the air flow rate G in Step S150.

Conversely, when an unstable state actually exists while the engine is idling, the control is performed as follows. Whether or not the shift range is neutral is determined in Step S160. If the shift position is neutral, a fixed pulse TFT determined specifically for the neutral state is set in Step S170. If the shift range is not neutral, fixed pulse TFD is set in Step S180.

Thus, in an unstable state in which disturbance of the air flow rate signal G has been caused by a drastic change in the intake air temperature, fuel injection is controlled based on the fixed pulse TFN or TFD corresponding to the instant shift position, rather than on the air flow rate signal G which is not credible, and any slight offset of the control is covered by a feedback control of the air-fuel ratio. With such a control method, it is possible to prevent a fluctuation in the air-fuel ratio or rough idling. Preferably, the function for learning the air-fuel ratio is suspended during fuel injection under the control of the fixed pulse. In the described example of the control method, the control is performed with a considerable level of accuracy because the fuel injection is conducted in response to a fixed pulse selected in accordance with the shift range.

Figure 9:
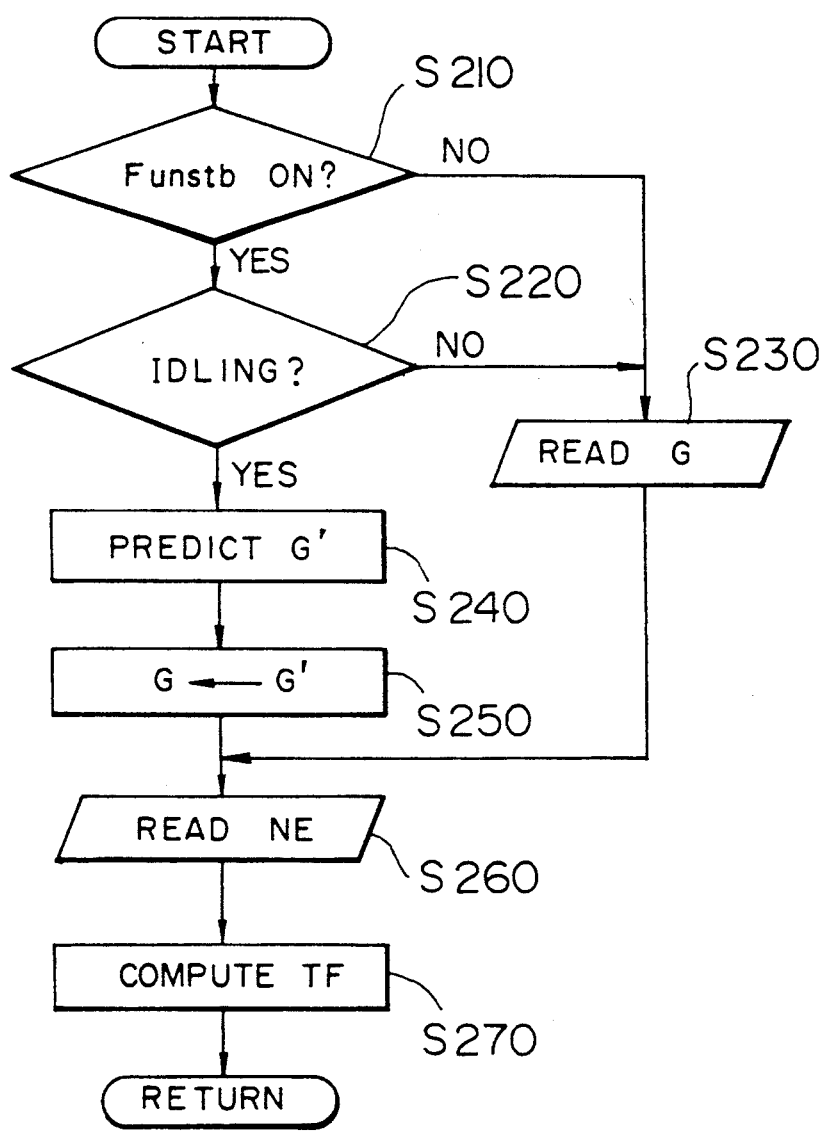
FIG. 9 is a flow chart illustrative of a process control of the second embodiment.

A second example of the control method will be described with reference to FIG. 9.

In the second embodiment, whether an unstable state actually exists and whether the engine is in the idling state are determined in Steps S210 and S220 as in the first example of the control method. When no unstable state exists or when the engine is running rather than idling even though an unstable state exists, a step S230 is executed to read the air flow rate G computed on the basis of the output AFS of the thermal air flowmeter 33.

On the other hand, when an unstable state actually exists while the engine is unstable, a predicted value G1 of the air flow rate is computed in Step S240 on the basis of a parameter indicative of the control amount of the ISCV 61, e.g., flow rate of air shared by the ISC, degree of opening of ISC or the like, and this air flow rate G' is used as the computed air flow rate G in Step S250. Then, the engine speed NE is read in Step S260, and the fuel injection pulse TF is determined in Step S270 on the basis of the engine speed E and the computed air flow rate G. The predicted value G' of the air flow rate is predicted on the basis of a relationship between the computed air flow rate G and the ISCV control parameter, the relationship having been learned under a condition which is free of the thermal transient state.

As has been described, the second example of the control method features that, when the intake system is in a thermal transient period, the intake air flow rate is predicted on the basis of a parameter which is not influenced by heat, and the air-fuel ratio is controlled in accordance with the predicted intake air flow rate. Thus, the second example of the control method offers an advantage that control precision equivalent to that obtained in a normal state can be attained even when the intake system is in a thermal transient state.

A description will now be given of a third example of the control method and a ground for such a control method.

Unstable states caused by thermal transient states last long when the intake air flow rate is small. In addition, the smaller the air flow rate, the greater the disturbance of the thermal air flowmeter 33. Conversely, when the airflow rate is large, the air is distributed over the entire portion of the air cleaner element 3 so as to realize a uniform temperature distribution while shortening the time until the whole air cleaner element is cooled.

Figure 10:
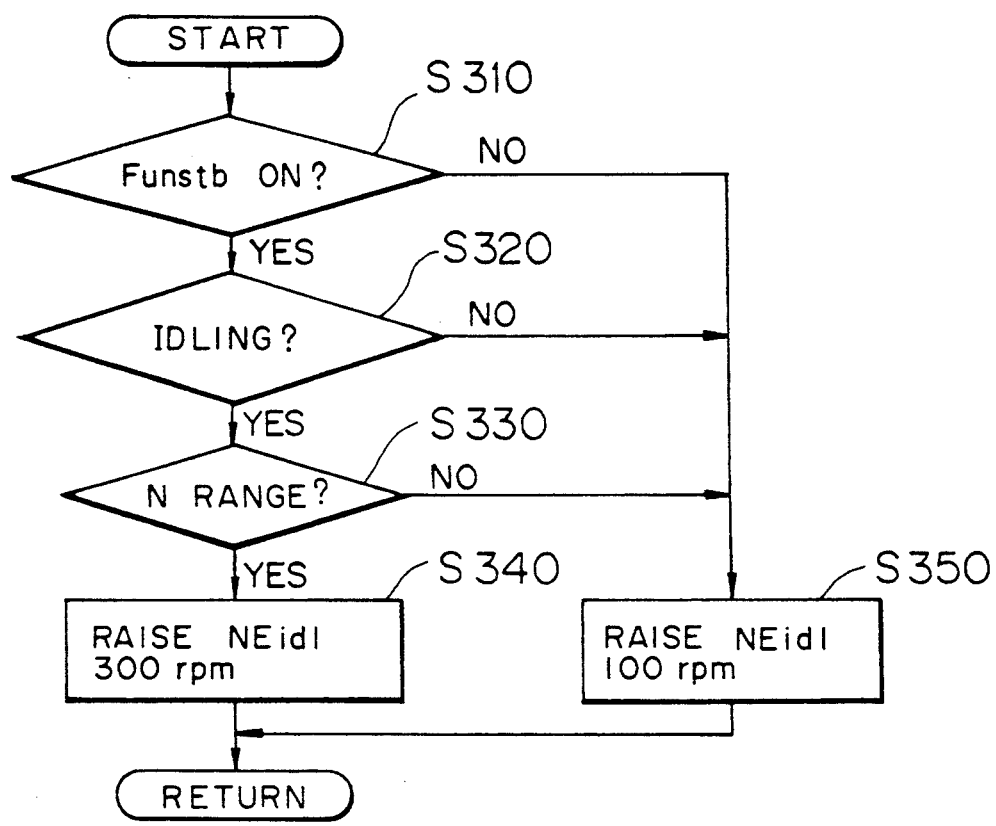
FIG. 10 is a flow chart illustrative of a process control of the third embodiment.

Referring to FIG. 10, in the third example of the control method, answers YES are given to the questions in Steps S310 and S320 when an unstable state exists due to a thermal transition state in the intake system while the engine is idling. Then Step S320 is executed to determine whether the shift range is N and, if the answer is YES, the process proceeds to Step S340 which elevates the command idle speed NEidl by 300 rpm. When the shift position is not neutral, an answer NO is given to the question in Step S330 and the process proceeds to Step S350 which elevates the command idle speed NEidl by 100 rpm.

Thus, according to the third example of the control method, when unstable state due to thermal transient state exists, the air flow rate shared by the ISCV is increased so as to increase the rate of flow of the air through the air cleaner element 3. Consequently, an unstable state due to a thermal transient period is eliminated in a short time, thus enabling quick recovery of normal operating condition from extraordinary state such as rough idling.

A description will now be given of a fourth example of the control, together with the ground for such a control.

Usually, a thermal transient period is accompanied by a variation in the engine speed NE. This is attributable to the fact that the engine torque decreases due to an imperfect burning of the mixture caused by an inadequate control of the air-fuel ratio. The "variation" in the engine speed NE in this case is used to mean "reduction" in the engine speed NE.

Figure 11:
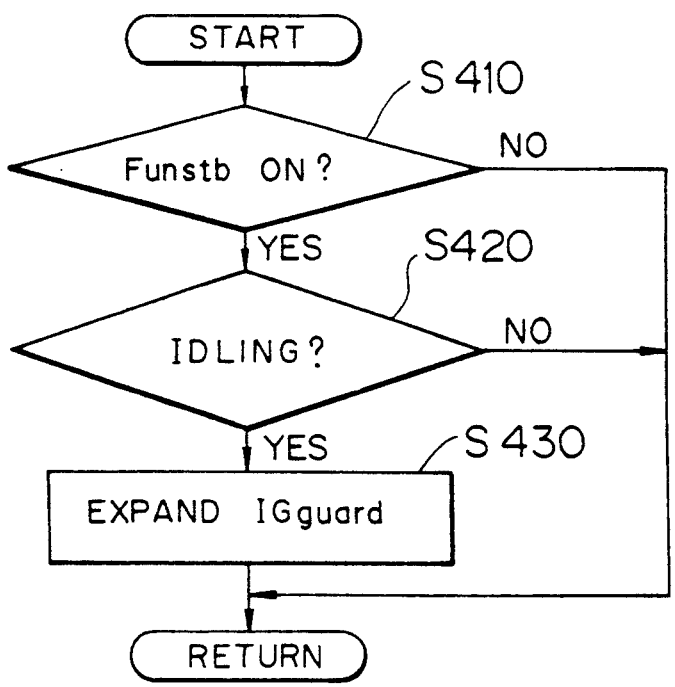
FIG. 11 is a flow chart illustrative of a process control of the fourth embodiment.

Referring to FIG. 11, in the fourth example of the control method, answers YES are given to the questions posed in Steps S410 and S420 when an unstable state due to a thermal transient period exists while the engine is idling. The process then proceeds to Step S430 in which the guard value IGguard of the ignition feedback is expanded. Namely, the amount of feedback is increased at the ignition angle advancing side to increase the engine speed NE, thus effecting a control to eliminate the above-mentioned variation in the engine speed, so as to prevent the occurrence of a trouble such as engine stall.

The same effect can be obtained by elevating the engine speed by increasing the amount of feed back to the ISCV so as to increase the amount shared by the ISCV, instead of expanding the guard amount IGguard of the ignition feedback control.

A description will now be given of a fifth example of the control method, as well as a ground of such a control method.

When the intake system is a thermal transient state, the fuel injection rate varies irregularly due to the disturbance in the air flow rate signal AFS. This is attributable to the fact that the ordinary air-fuel feedback control system cannot respond to quick increases or decreases in the fuel injection rate caused by the disturbances in the air flow rate signal AFS.

Figure 12:
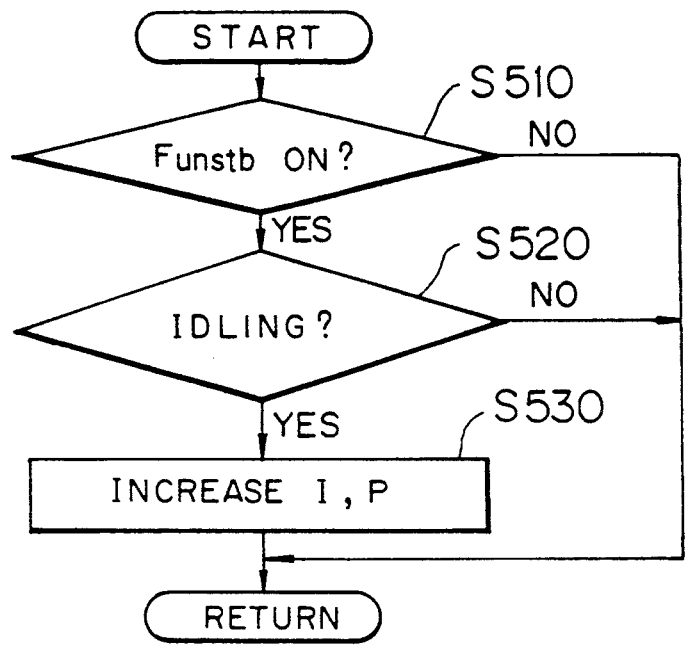
FIG. 12 is a flow chart illustrative of a process control of the fifth embodiment.

Referring to FIG. 12 in the fifth example of the control method, answers YES are given to the questions both in Steps S510 and S520 when an unstable state due to a thermal transient state exists while the engine is idling. The process then proceeds to Step S530 which increases the integrated value I and the skip value P in the feedback control for controlling the air-fuel ratio. Consequently, the gain of the feedback control is increased to improve the response to variation in the air-fuel ratio, thus contributing to a cleaning of the exhaust emissions.

Figure 13:
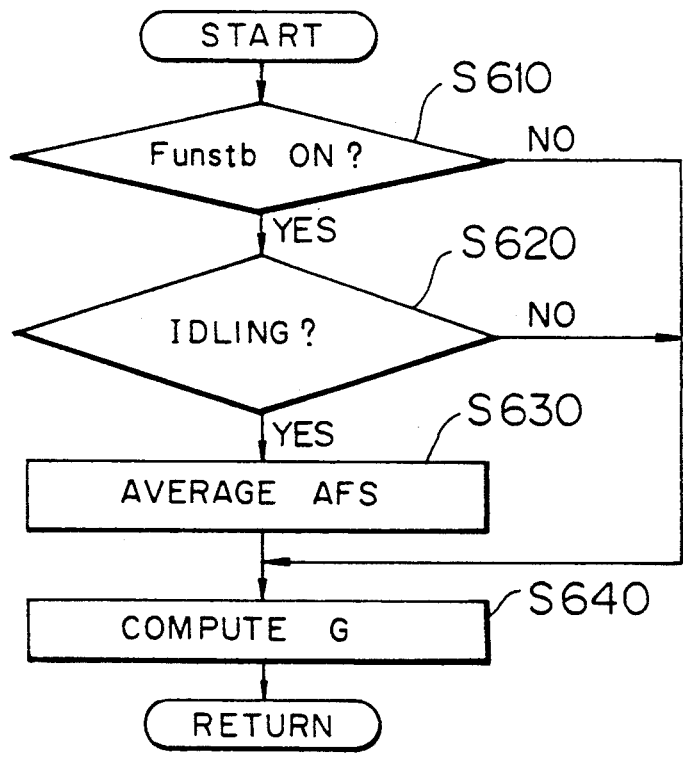
FIG. 13 is a flow chart illustrative of a process control of the sixth embodiment.

A description will now be given of a sixth example of the control method with reference to FIG. 13.

In this example of the control method, answers YES are given both in Steps S610 and S620 when an unstable state due to a thermal transient state exists while the engine is idling. The process then proceeds to Step S630 which averages the output signal AFS from the thermal air flowmeter 33 and the air flow rate G is computed on the basis of the smoothed output value, thus reducing the influence of variation and thereby stabilizing the control.

Each of the six examples of the control methods are effective as a measure to be taken in response to the lack of stability in the air flow rate signal AFS under a thermal transient state. Each of these six examples may be executed independently or two or more of these control methods may be executed in combination to attain a greater effect.

Although some preferred embodiments and examples of control employed in these embodiment have been specifically described, it is to be understood that the described embodiments and examples are only illustrative and various changes and modifications may be imparted thereto within the scope of the present invention.

As will be understood from the foregoing description, the device of the invention for determining transient state of intake air temperature in an internal combustion engine can precisely detect unstable state of control in which ripple of the output from the thermal air flowmeter takes place.

On the other hand, the air-fuel mixture controlling device of the present invention makes it possible to prevent or quickly suppress any fluctuation in the air-fuel ratio or rough idling which may otherwise occur or last a long time when the output from an intake air flow rate sensor ripples or fluctuates.

A description will now be given of a third embodiment of the present invention.

Figure 14:
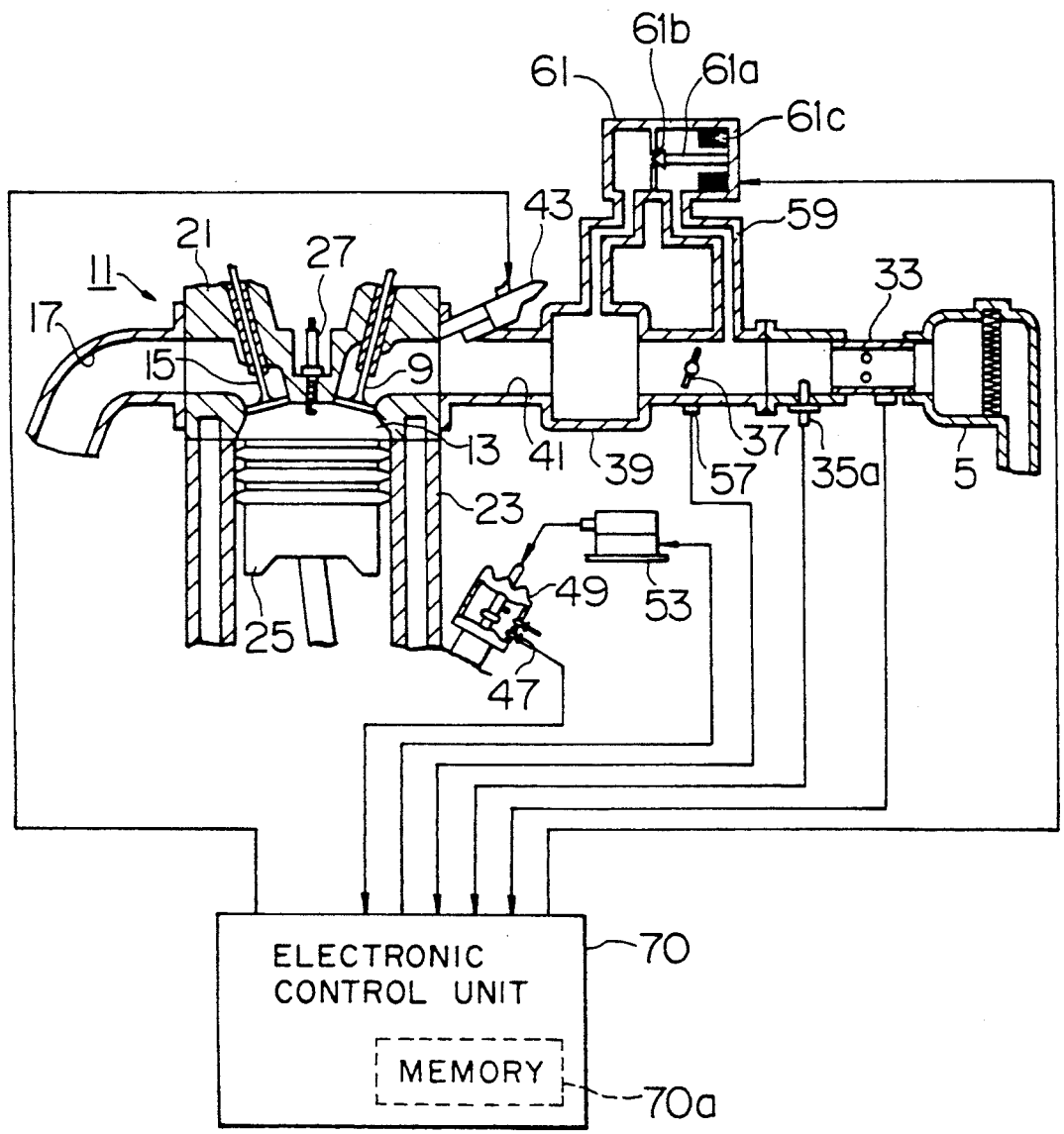
FIG. 14 is an illustration of the construction of a system as the third embodiment.

FIG. 14 schematically shows the construction of a system as the third embodiment of the present invention. In this Figure, the same reference numerals are used to denote the same components or portions as those employed in the embodiment shown in FIG. 1. An intake air temperature sensor 35a for sensing the temperature of the intake air is disposed between the thermal air flowmeter 33 and the throttle valve 37. The ISC valve 61 has a valve member 61a, a valve seat 61b and a coil 61c. The valve member 61a is normally held in contact with the valve seat 61b by being urged by a spring which is not shown, but is moved away from the valve seat 61b when the coil 61c is excited. Consequently, the bypass passage 59 is opened when the coil 61c of the ISC valve 61 is energized and is closed as the coil 61c is de-energized. The opening of the ISC valve is controlled by a duty-ratio through a pulse-width modulation of the energizing pulses.

The electronic control unit 70 in this embodiment includes an actuator control, first and second fuel injection rate controls and memory. A throttle switch 57, a thermal air flowmeter 33, an intake air temperature sensor 35a and a rotation speed sensor 47 are connected to the electronic control unit 70 so as to deliver signals to the latter. The electronic control unit 70 is connected to each fuel injector 43, ISC valve 61 and the igniter 53 so as to deliver driving signals to the drivers of these components.

The electronic control unit 70 has a backup memory 70a which stores a map (see FIG. 15) having a characteristic curve L. In this map, the axis of ordinate represents the amount $G_I$ of control of the ISC valve 61, while the axis of abscissa represents the intake air flow rate measured by a thermal air flowmeter 33. This map will be referred to as the $G_I$-$G_{AV}$ map, hereinafter. The data, i.e., the characteristic curve L, in the $G_I$-$G_{AV}$ map is rewritable.

The described internal combustion engine control system operates as follows.

When the engine is idling, the electronic control unit 70 conducts an ISC valve control. More specifically, when the throttle valve 37 is set to idle position, the throttle switch 57 is turned on so that the electronic control unit 70 commences the control of the opening of the ISC valve 61 (referred to as ISC control amount $G_1$) in such a manner as to make the engine speed Ne sensed by the rotation speed sensor 47 coincide with the command engine speed.

Figure 16:
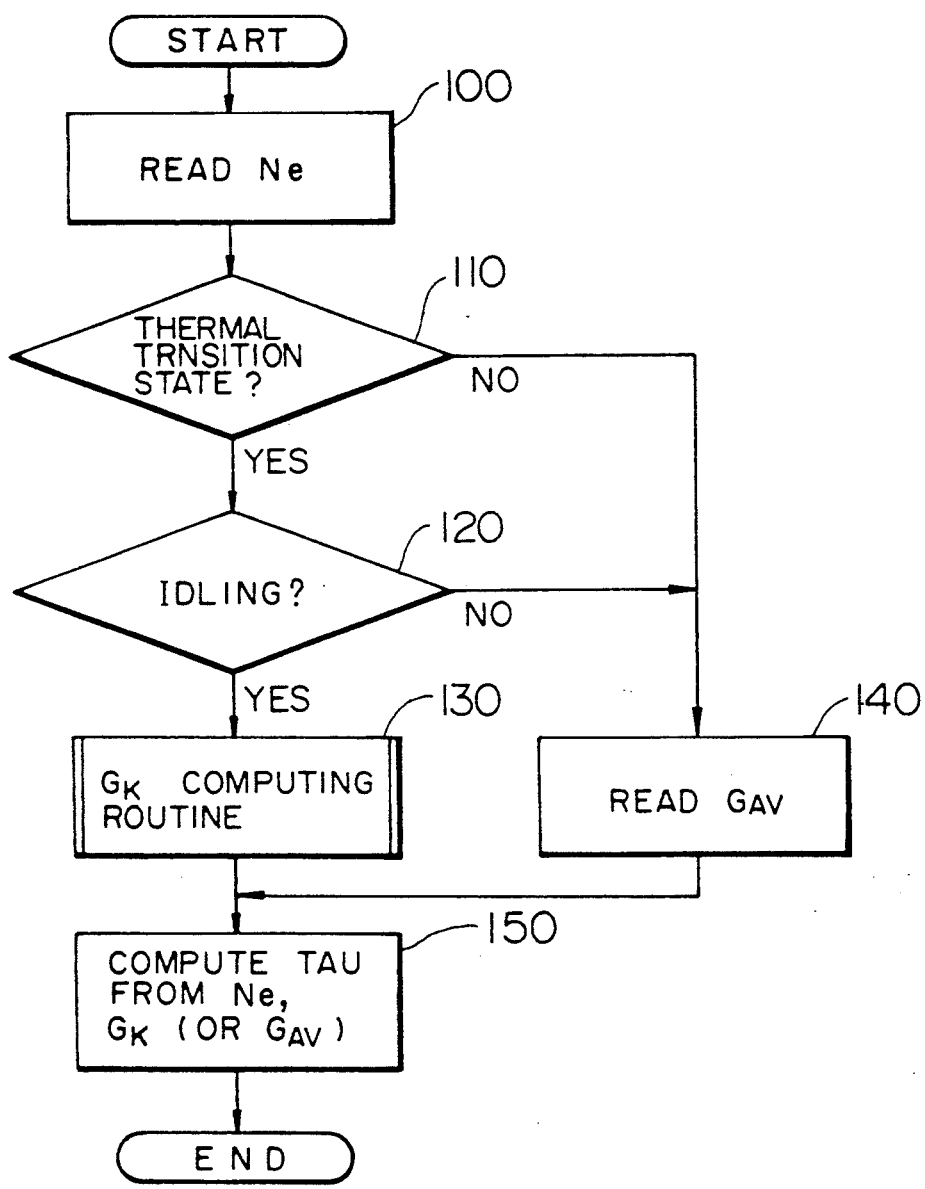
FIG. 16 is a flow chart showing the routine for computing the fuel injection rate in the third embodiment.
Figure 17:
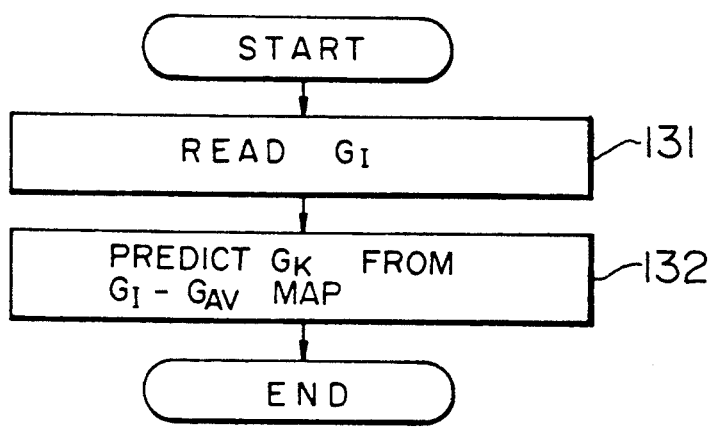
FIG. 17 is a flow chart showing a routine for determining the predicted intake airflow rate in the third embodiment.
Figure 18:
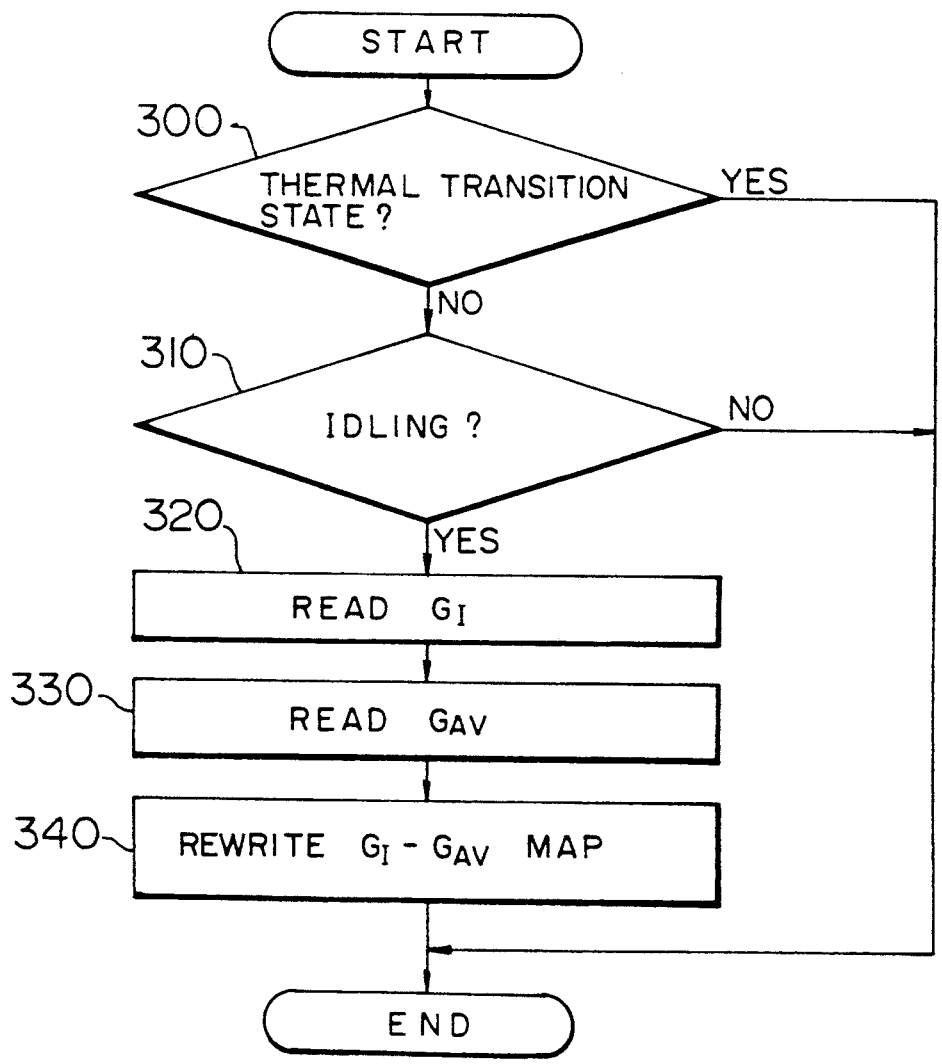
FIG. 18 is a flow chart showing a routine for rewriting the $G_f$-$G_{AV}$ map.
Figure 19A:
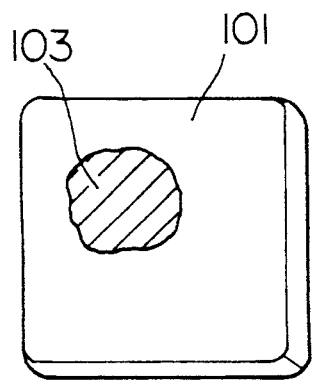
FIGS. 19A and 19B are illustrations of a prior art explanatory of the problem of the prior art.
Figure 19B:
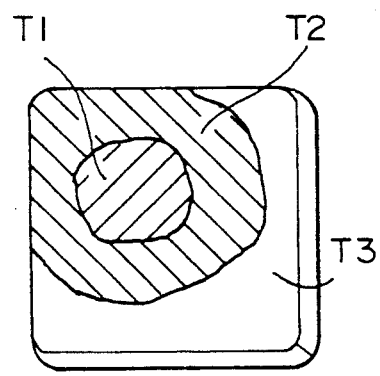

FIGS. 16 to 18 show flow charts of the routines executed by the electronic control unit 70.

Referring first to FIG. 16, a routine for computing the fuel injection rate is triggered at a regular time interval or crank angle interval. In Step 100, the electronic control unit 70 detects the engine speed Ne through the rotation speed sensor 47. In Step 110, the electronic control unit 70 detects the intake air temperature in the intake pipe 41 through the intake air temperature sensor 35a, and examines the state of variation in the intake air temperature to determine whether the engine 11 is in a thermal transient period. More specifically, the electronic control unit 70 compares the variation amount of the intake air temperature with a predetermined value, and determines that the engine 11 is in a thermal transient period when the detected variation amount exceeds the predetermined value. The process proceeds to Step 120 when the engine is in thermal transient state, whereas, when the engine is not in thermal transient state, the process proceeds to Step 140. In Step 120, the electronic control unit 70 determines whether the throttle valve 37 has been fully closed, i.e., whether the engine is idling, on the basis of the signal from the throttle switch 57. When the engine is idling, the process proceeds to Step 130. If not, the electronic control unit 70 executes Step 140.

In Step 130, the electronic control unit 70 executes a computation of the predicted intake air flow rate $G_K$. This routine will be described with reference to FIG. 17. The aforementioned ISC control amount $G_I$ is read in Step 131 and, in Step 132, a measured intake air flow rate $G_{AV}$ corresponding to the ISC control amount $G_I$ is determined using the data in the $G_I$-$G_{AV}$ map shown in FIG. 15. The measured intake air flow rate $G_{AV}$ thus determined is used as the predicted intake air flow rate $G_K$. In Step 140, the electronic control unit 70 reads the intake air flow rate measured by the thermal air flowmeter 33.

After executing Steps 130 and 140, the electronic control unit 70 executes Step 150 to compute the fuel injection rate TAU on the basis of the engine speed Ne read in Step 100, the predicted intake air flow rate $G_K$ read in Step 130 and the actually measured intake air flow rate $G_{AV}$ read in Step 140, thus completing the routines.

The electronic control unit 70 then causes the fuel injector 43 to inject fuel at the injection rate TAU computed through the described routines.

Figure 15:
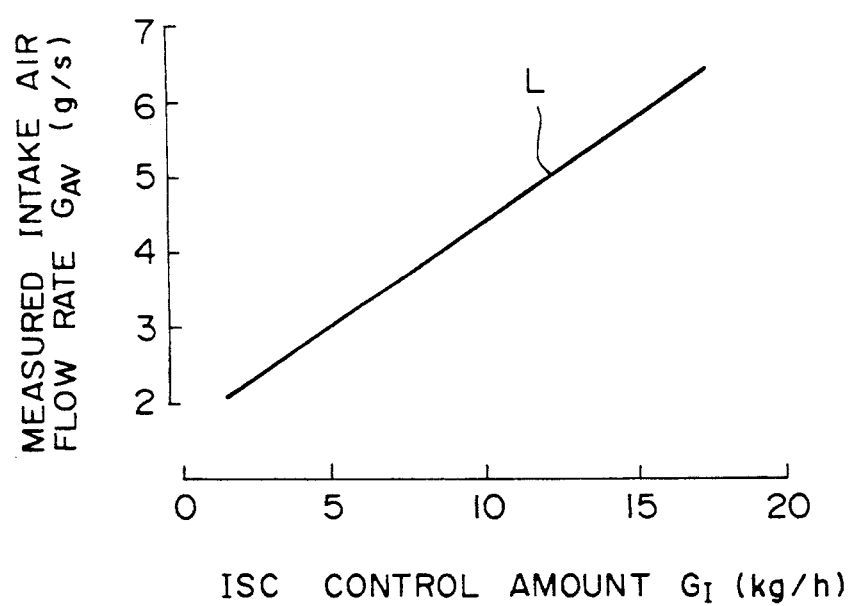
FIG. 15 is a graph showing a $G_f$-$G_{AV}$ map.

The $G_I$-$G_{AV}$ map shown in FIG. 15 is rewritable to enable updating of the data, i.e., the characteristic curve L, in order to deal with changes in the conditions such as a secular change in the rate of leak of air in the intake system during idling and to absorb any fluctuation in the control. A routine for rewriting the data of the $G_I$-$G_{AV}$ map will be described with reference to a flow chart shown in FIG. 18.

The electronic control unit 70 executes Steps 300 and 310 to determine that the engine 11 is not in a thermal transient state and that the engine is idling. These steps 300 and 310 are the same as Steps 110 and 120 of the flow shown in FIG. 16.

When affirmative answers are given in Steps 300 and 310 to confirm that the engine is not in a thermal transient state and is idling, the process proceeds to Step 320 which reads the ISC control amount $G_I$, followed by Step 330 which reads the air flow rate $G_{AV}$ actually measured by the thermal air flowmeter 33.

Thus, the data in the $G_I$-$G_{AV}$ map is rewritten only on conditions of the engine being not in a thermal transient state and the engine being in an idle state. Consequently, any secular change of condition caused by, for example, a clogging in the intake system is taken into the data on the $G_I$-$G_{AV}$ map, thus enabling a higher accuracy of the control.

As will be understood from the foregoing description, in the third embodiment of the present invention, the fuel injection rate TAU is computed on the basis of the predicted intake air flow rate $G_K$ read from the $G_I$-$G_{AV}$ map stored in the electronic control unit 70, rather than on the intake air flow rate measured by the thermal air flowmeter 33. It is therefore possible to eliminate any inconvenience caused by error in the output of the thermal air flowmeter 33 which inevitably occurs in the conventional control system, thus attaining a higher accuracy in the control of the fuel injection rate.

The described third embodiment also is only illustrative and may be changed or modified. For instance, although in the described third embodiment the predicted air flow rate $G_K$ is read from the $G_I$-$G_{AV}$ map by locating the ISC control amount $G_I$, the predicted air flow rate $G_K$ may be determined by using, in place of the ISC control amount $G_I$, a suitable value indicative of the amount of control of the ISV valve 61, such as, for example, the actual opening degree of the ISC valve 61 or the duty ratio of the driving pulses applied to the coil 61C of the ISC valve 61.

As will be understood from the foregoing description the present invention offers a great advantage in that the fuel injection rate can be determined exactly and adequately.

What is claimed is:

1. A fuel control system of an internal combustion engine of a type which aspirates an intake air through an intake passage via an air cleaner, comprising:
    a thermal air flowmeter disposed in a portion of said intake passage downstream of said air cleaner for measuring a flow rate of said intake air;
    means for detecting an idling state of said internal combustion engine;
    means for detecting a speed of said engine;
    means for computing a fuel injection rate on the basis of said intake air flow rate and said engine speed;
    means for calculating whether an intake air temperature transient state exists which makes said flow rate of said intake air unstable, while said idling state of said engine is being detected; and
    means for executing, when said calculating means has calculated that said intake air temperature transient state exists, a transient control function calculated in relation to said intake air temperature transient state.

2. A fuel control system according to claim 1, further comprising:
    means for detecting a temperature of said intake air upstream of said air cleaner; and
    means for detecting a temperature of said intake air downstream of said air cleaner;
    said calculating means including means for calculating that said intake air temperature transient state exists which makes said flow rate of said intake air unstable, when a difference between said upstream and said downstream intake air temperatures exceed a predetermined value.

3. A fuel control system according to claim 1, wherein said determining means includes:
    means for detecting a state of variation of said flow rate of said intake air; and
    means for calculating that said intake air temperature transient state exists which makes said flow rate of said intake air unstable, when said variation of said flow rate of said intake air exceeds a predetermined value.

4. A fuel control system according to claim 1, wherein said executing means includes means for giving a control signal for increasing said flow rate of said intake air.

5. A fuel control system according to claim 1, wherein said executing means includes means for altering a computation by said means for computing said fuel injection rate.

6. A fuel control system according to claim 1, wherein said executing means includes means for altering a control of said fuel injection rate performed by said fuel injection rate computing means.

7. A fuel control system according to claim 1, further comprising:
    an actuator for controlling said flow rate of said intake air during said idling of said engine;
    means for controlling said actuator to make said engine speed coincide with a command idle speed; and
    means for storing a relationship between a value corresponding to an amount of control of said actuator and said intake air flow rate;
    said executing means having means for calculating said flow rate of said intake air using data in said storing means in accordance with said amount of control of said actuator, and for computing said fuel injection rate on the basis of said calculated intake air flow rate and said engine speed.

8. A fuel control system according to claim 7, further comprising learning means for learning data to be stored in said storing means on the basis of a value corresponding to said amount of control of said actuator and said intake air flow rate obtained when said intake air temperature transient state does not exist while said engine is idling.

9. A fuel control system according to claim 6, wherein said executing means further includes means for fixing said fuel injection rate.

10. A fuel control system according to claim 5, further comprising:
    an actuator for controlling said flow rate of said intake air during said idling of said engine; and
    means for controlling said actuator such that said engine speed coincides with a command idle speed;
    said executing means including means for increasing said command idle speed.

11. A fuel control system according to claim 1, wherein said executing means includes means for widening a guard value of an ignition feedback control.

12. A fuel control system according to claim 1, wherein said executing means includes means for increasing a control gain of an air-fuel ratio feedback control.

13. A fuel control system according to claim 1, wherein said executing means includes means for averaging said flow rate of said intake air and providing said average to said fuel injection rate computing means.

14. A fuel control system for an internal combustion engine, comprising:
- an auxiliary air flow rate controlling actuator disposed in an auxiliary air passage by-passing a throttle valve in an intake passage and controlling a flow rate of auxiliary air during an idling of said engine;
- means for detecting a speed of said engine;
- means for controlling said actuator such that said engine speed coincides with a command idle speed;
- a thermal air flowmeter provided in said intake passage for measuring a flow rate of intake air;
- an intake air temperature detecting means provided in said intake passage for detecting a temperature of said intake air;
- means for storing the relationship between a value corresponding to an amount of control of said actuator and said intake airflow rate;
- first fuel injection rate computing means for computing a rate of fuel injection from a fuel injector on the basis of said intake air flow rate and said engine speed, when said engine is not idling and when, even though said engine is idling, an amount of variation of said intake air temperature is within a predetermined range; and
- second fuel injection rate computing means for calculating said intake air flow rate using a data stored in said storing means from said value corresponding to said amount of control of said actuator and for computing said rate of fuel injection from said fuel injector on the basis of said intake air flow rate calculated using said data and said engine speed, in a thermal transient state in which said amount of variation of said intake air temperature exceeds a predetermined value while said engine is idling.

15. A fuel control system according to claim 14, wherein said data stored in said means is learned from said value corresponding to said amount of control of said auxiliary air flow rate controlling actuator and said intake air flow rate, when said amount of variation of said intake air temperature is below said predetermined value.

* * * * *